(12) United States Patent
Motokawa et al.

(10) Patent No.: US 10,263,229 B2
(45) Date of Patent: Apr. 16, 2019

(54) BATTERY BLOCK

(71) Applicant: Panasonic Intellectual Property Management Co., Ltd., Osaka (JP)

(72) Inventors: Shinya Motokawa, Osaka (JP); Daisuke Kishii, Osaka (JP); Keisuke Shimizu, Osaka (JP); Akira Takano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/126,858

(22) PCT Filed: Mar. 5, 2015

(86) PCT No.: PCT/JP2015/001182
§ 371 (c)(1),
(2) Date: Sep. 16, 2016

(87) PCT Pub. No.: WO2015/162841
PCT Pub. Date: Oct. 29, 2015

(65) Prior Publication Data
US 2017/0092909 A1     Mar. 30, 2017

(30) Foreign Application Priority Data

Apr. 25, 2014 (JP) ................. 2014-091020

(51) Int. Cl.
*H01M 2/10* (2006.01)
*H01M 10/625* (2014.01)
(Continued)

(52) U.S. Cl.
CPC ....... *H01M 2/1077* (2013.01); *H01M 2/1094* (2013.01); *H01M 10/613* (2015.04);
(Continued)

(58) Field of Classification Search
None
See application file for complete search history.

(56) References Cited

U.S. PATENT DOCUMENTS

2002/0043959 A1    4/2002  Tanaka et al.
2003/0017383 A1*   1/2003  Ura .................... F28D 15/0275
                                                        429/120
(Continued)

FOREIGN PATENT DOCUMENTS

CN         1173423 C    10/2004
CN      101682007 A     3/2010
(Continued)

OTHER PUBLICATIONS

The Engineering Toolbox (http://www.engineeringtoolbox.com/thermal-conductivity-d_429.html) (Mar. 30, 2014).*

(Continued)

*Primary Examiner* — Carmen V Lyles-Irving
(74) *Attorney, Agent, or Firm* — McDermott Will & Emery LLP (57) ABSTRACT

Cells are arranged in a predetermined arrangement and are held by holding unit. The holding unit includes a first holding unit, a second holding unit, and a third holding unit. The first holding unit holds cells so as to partially cover the one side of the outer peripheral surfaces of the cells in the longitudinal direction. The second holding unit holds the cells so as to partially cover the other side of the outer peripheral surfaces of the cells in the longitudinal direction. The third holding unit holds the cells so as to cover a region that is covered with neither the first holding unit nor the second holding unit, of the outer peripheral surfaces of the cells in the longitudinal direction.

9 Claims, 4 Drawing Sheets

(51) Int. Cl.
 H01M 10/6551 (2014.01)
 H01M 10/643 (2014.01)
 H01M 10/617 (2014.01)
 H01M 10/627 (2014.01)
 H01M 10/613 (2014.01)
 H01M 10/6554 (2014.01)
 H01M 10/6563 (2014.01)

(52) U.S. Cl.
 CPC ....... *H01M 10/617* (2015.04); *H01M 10/625* (2015.04); *H01M 10/627* (2015.04); *H01M 10/643* (2015.04); *H01M 10/6551* (2015.04); *H01M 10/6554* (2015.04); *H01M 10/6563* (2015.04); *H01M 2220/20* (2013.01)

(56) References Cited

U.S. PATENT DOCUMENTS

2010/0092849 A1* 4/2010 Wood ................. H01M 2/1072
 429/99
2010/0092949 A1* 4/2010 Liu ........................ C12Q 1/689
 435/6.15
2013/0316202 A1* 11/2013 Bang ................... H01M 2/1072
 429/72
2014/0302377 A1* 10/2014 Naito ................... H01M 2/105
 429/156

FOREIGN PATENT DOCUMENTS

| | | |
|---|---|---|
| CN | 103415942 A | 11/2013 |
| JP | 2002-124225 | 4/2002 |
| JP | 2005-285456 | 10/2005 |
| JP | 2013-196810 | 9/2013 |

OTHER PUBLICATIONS

Definition of engaged from www.thefreedictionary.com (Jan. 13, 2018).*
International Search Report of PCT application No. PCT/JP2015/001182 dated May 19, 2015.
English Translation of Chinese Search Report dated Jul. 13, 2018 for the related Chinese Patent Application No. 201580019237.7.

* cited by examiner

BATTERY BLOCK

CROSS-REFERENCE TO RELATED APPLICATIONS

This application is a U.S. national stage application of the PCT International Application No. PCT/JP2015/001182 filed on Mar. 5, 2015, which claims the benefit of foreign priority of Japanese patent applications 2014-091020 filed on Apr. 25, 2014, the contents all of which are incorporated herein by reference.

TECHNICAL FIELD

The present invention relates to a battery block.

BACKGROUND ART

As a power source for driving a motor of an electric car or the like, or as a power source for household use or industrial use, a battery block is used which is formed by interconnecting a plurality of cells such as lithium-ion cells in series or in parallel. A battery block used for high power application is charged and discharged at a high current, and the temperature of the cells increases. In such a case, in order to prevent the acceleration of cell degradation, it is preferable that the heat generated when each cell is charged and discharged is radiated efficiently and the cell performance is kept in a satisfactory state. For this purpose, for example, the following battery block is known. The arrangement surface of the cells is interposed between two radiation plates from both sides, and each radiation plate is brought into contact with the peripheral surfaces of the cells, thereby improving the heat radiation property from the surfaces of the cells (Patent Literature 1).

CITATION LIST

Patent Literature

PTL 1: Unexamined Japanese Patent Publication No. 2002-124225

SUMMARY OF THE INVENTION

A battery block of the present invention includes a plurality of cells, and a holding unit for holding the plurality of cells. The holding unit includes: a first holding unit that is made of a material having an insulation property, and holds the cells so as to partially cover the one side of outer peripheral surfaces of the cells in the longitudinal direction; a second holding unit that is made of a material having an insulation property, and holds the cells so as to partially cover the other side of the outer peripheral surfaces of the cells in the longitudinal direction; and a third holding unit that is made of a material having a heat conductivity, and holds the cells so as to cover a region that is covered with neither the first holding unit nor the second holding unit, of the outer peripheral surfaces of the cells in the longitudinal direction.

Above-mentioned configuration can provide a battery block that can achieve weight reduction and safer heat radiation.

DESCRIPTION OF EMBODIMENT(S)

Prior to the description of an exemplary embodiment of the present invention, problems in the conventional battery block are described.

When a metal having an electric conductivity is selected as the material of a radiation plate in order to improve the heat conductivity of the radiation plate, the weight of a component as a heat radiation function cannot be reduced, and safe heat radiation is required. The heat radiation, for example, means preventing the electric short-circuit with a positive electrode part or negative electrode part of a cell.

The present invention provides a battery block that addresses the above-mentioned problems, reduces the weight of the component as the heat radiation function, and can achieve safe heat radiation.

The example of the exemplary embodiment of the present invention is specifically described with reference to the accompanying drawings. In referred drawings, the same element is denoted with the same reference mark, and duplicate description of the same element is omitted in principle.

Figure 1:
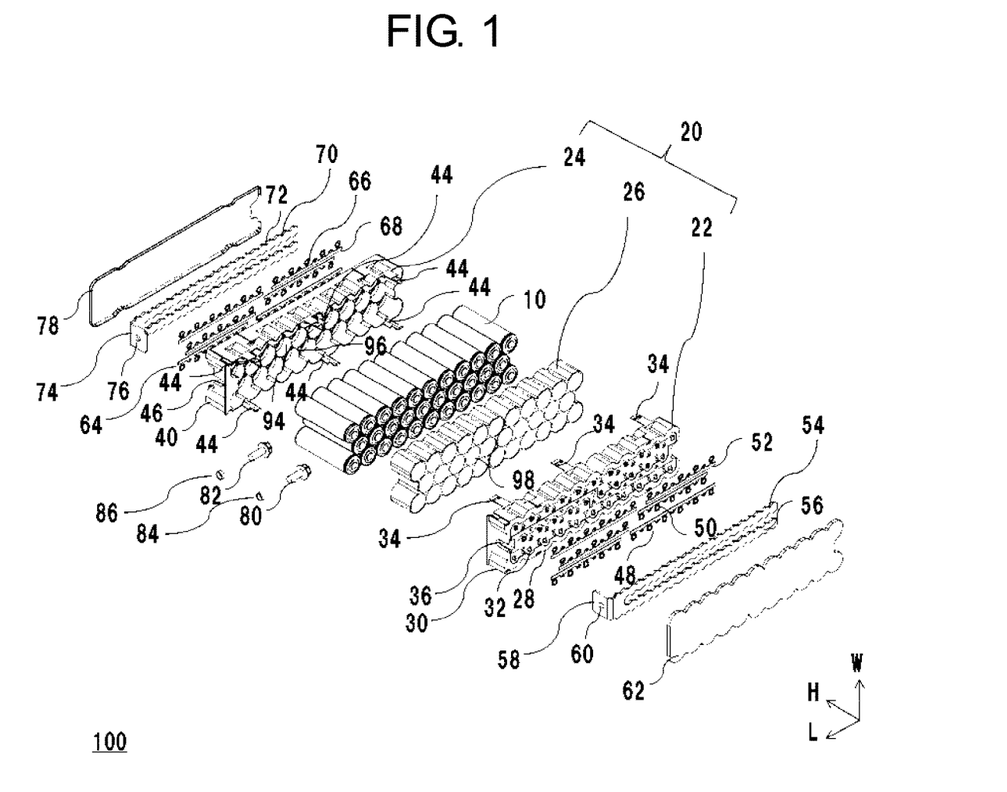
FIG. 1 is an exploded perspective view showing the configuration of a battery block in accordance with an exemplary embodiment of the present invention.
Figure 2:
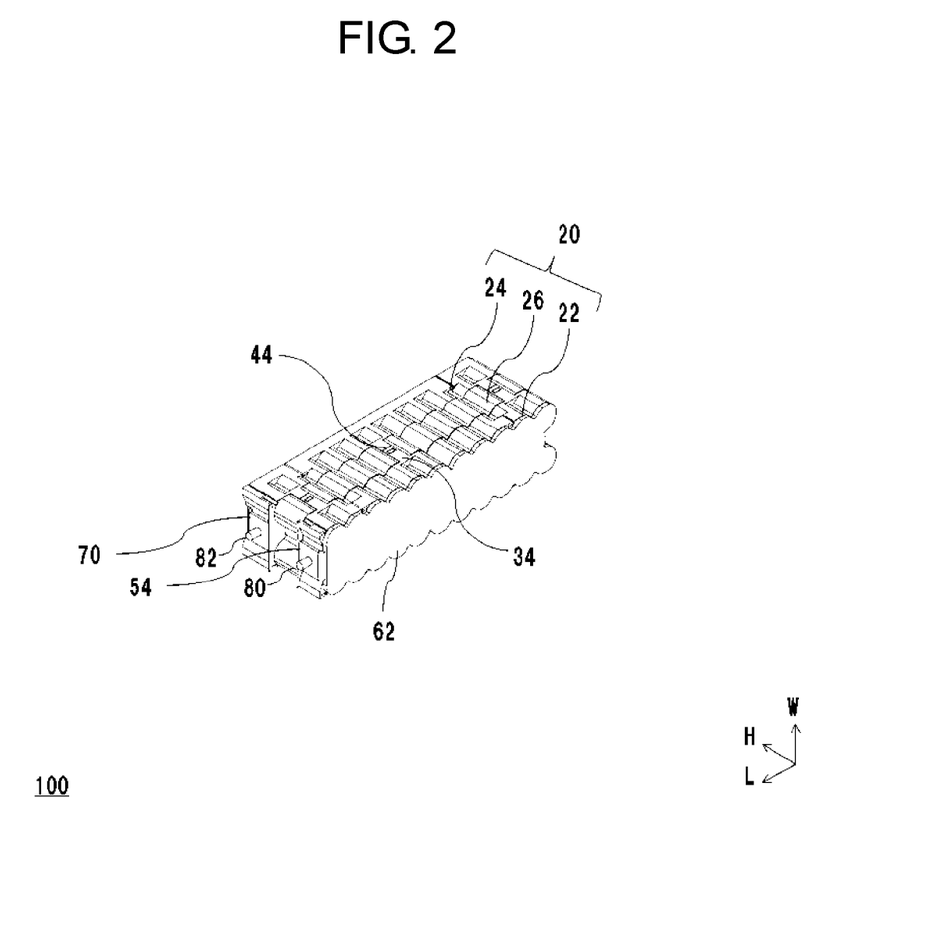
FIG. 2 is a perspective view showing the configuration of the battery block in accordance with the exemplary embodiment of the present invention.

FIG. 1 is an exploded perspective view showing the configuration of battery block 100 in accordance with the exemplary embodiment of the present invention. FIG. 2 is a perspective view showing the configuration of battery block 100 in accordance with the exemplary embodiment of the present invention. Battery block 100 is formed by interconnecting a plurality of cells 10 in parallel, and has a predetermined capacity. In the present exemplary embodiment, one battery block 100 is formed of 32 cells. Thirty-two cells 10 are arranged in a staggered arrangement while the positive electrodes are aligned to one side and the negative electrodes are aligned to the other side, and are held by holding unit 20.

Holding unit 20 includes first holding unit 22, second holding unit 24, and third holding unit 26. First holding unit 22 includes engagement recesses 34 extending in the longitudinal direction of cells 10. Second holding unit 24 includes engagement projections 44 extending in the longitudinal direction of cells 10. As shown in FIG. 2, first holding unit 22 is engaged with second holding unit 24 via engagement recesses 34 and engagement projections 44 so as to grasp the third holding unit.

In battery block 100, positive-side collection plate 54 is disposed on the positive side of cells 10, and negative-side collection plate 70 is disposed on the negative side thereof. Positive-side collection plate 54 is fastened to positive-side output terminal 80 via fastening member 84, and negative-side collection plate 70 is fastened to negative-side output terminal 82 via fastening member 86. Positive-side collection plate 54 is covered with positive-side lid 62, and is electrically insulated from the outside. Negative-side collection plate 70 is covered with negative-side lid 78, and is electrically insulated from the outside.

FIG. 1 and FIG. 2 show the H direction, L direction, and W direction as three mutually orthogonal axis directions. The H direction is the longitudinal direction of cells 10. The L direction and W direction mean the arrangement directions of the two-dimensional arrangement of cells 10, and it is assumed that the L direction is along the longer side and the W direction is along the shorter side. The same is true for the drawings shown later.

Each cell 10 is a chargeable/dischargeable secondary cell. In the present exemplary embodiment, a lithium-ion cell is assumed as the secondary cell. Another cell such as a nickel-metal-hydride cell, alkaline cell, or sodium cell may be used. FIG. 1 shows a perspective view of 32 cells 10 in a state where they are stored and arranged in battery block 100. As shown here, 32 cells 10 are arranged in the staggered (zigzag) arrangement that minimizes the clearance between adjacent cells. Three cell columns are arranged in width direction W (they are hereinafter referred to as "first cell column", "second cell column", and "third cell column" sequentially from the upside of the page in the W direction in FIG. 1). The cell columns include 11 cells, 10 cells, 11 cells along the L direction, respectively.

Each cell 10 has a cylindrical outer shape. Of both ends of the cylindrical shape, one end is used as a positive terminal, and the other end is used as a negative terminal. One example of each cell 10 is a lithium-ion cell having a diameter of 18 mm, a height of 65 mm, an inter-terminal voltage of 3.6 V, and a capacity of 2.5 Ah. This is simply an example for description, another size and another characteristic value may be used. Cell 10 is not limited to a cylindrical cell, but may be a cell having another outer shape such as a square shape.

First holding unit 22 holds 32 cells 10 so that they are arranged in a staggered arrangement and so as to partially cover the positive side of the outer peripheral surfaces of cells 10 in the H direction. First holding unit 22 has a substantially rectangular box shape as a whole, and one end in the H direction is open. First holding unit 22 includes first plane portion 28 and first side-surface portion 30. First plane portion 28 includes through holes 32 at the positions corresponding to the positive terminals of 32 cells 10 so as to electrically connect the positive terminals to positive-side lead portion 48. On opposite surfaces of first side-surface portion 30 in the W direction, engagement recesses 34 coupled to engagement projections 44 of second holding unit 24 are formed. First slit 36 into which positive-side output terminal 80 is fitted is formed on one surface of first side-surface portion 30 in the L direction (surface on the left side in the page in FIG. 1).

Figure 3:
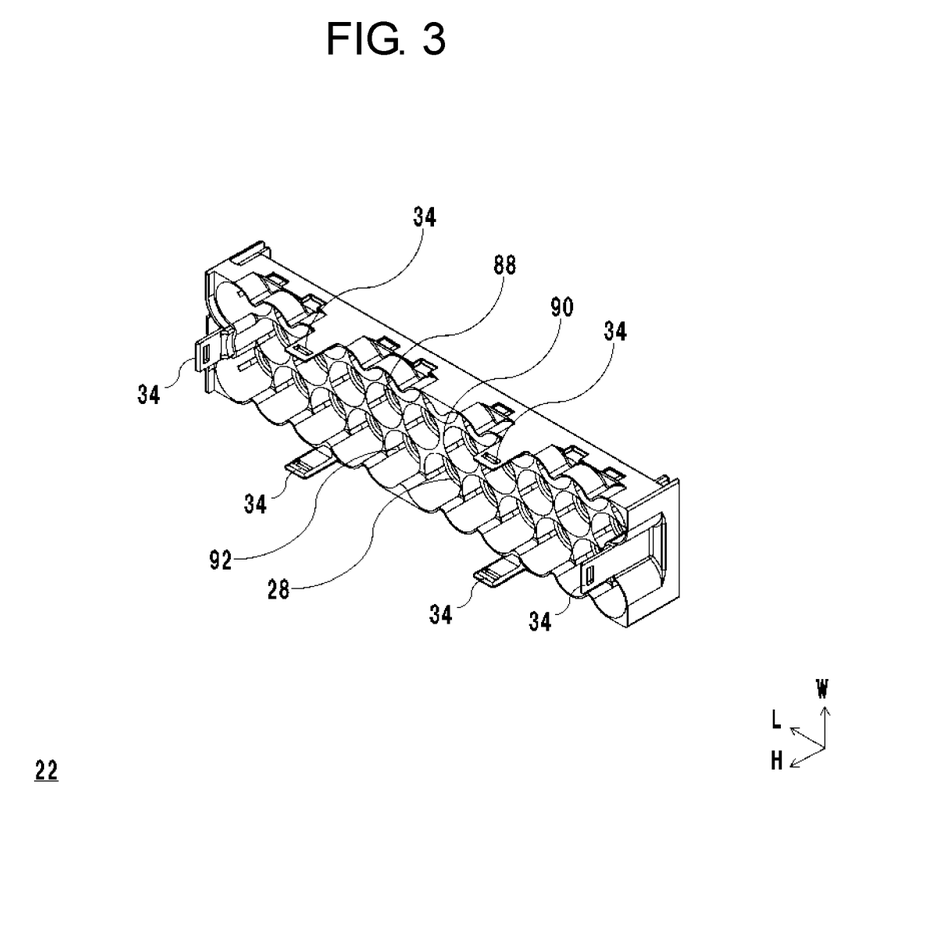
FIG. 3 is a perspective view of a first holding unit used in the exemplary embodiment of the present invention.

FIG. 3 is a perspective view of first holding unit 22 used in the exemplary embodiment of the present invention. First holding unit 22 includes first storage portions 88 for partially storing the positive side of cells 10. First storage portions 88 are defined by first plane portion 28 and first side-wall portions 90, and each have a substantially columnar shape as a whole. In order to facilitate the insertion of each cell 10, each first storage portion 88 is formed so as to form a slight clearance between stored cell 10 and each first side-wall portion 90. During conveyance of battery block 100 or the like, this clearance sometimes makes cell 10 rattle. First rib 92 is formed on the inner surface of each first side-wall portion 90 so as to project inward. The amount of projection of each first rib 92 is decreased as first rib 92 extends away from first plane portion 28. When first rib 92 comes into contact with cell 10 to support cell 10, the rattling of cell 10 is prevented without using an adhesive or the like. By decreasing the amount of projection of first rib 92 as first rib 92 extends away from first plane portion 28, cell 10 can be held stably while the ease of insertion of cell 10 is kept. Such first holding unit 22 is made of a material having a predetermined insulation property, heat resistance, and strength, and is formed by integrally molding first plane portion 28, first side-surface portion 30, first side-wall portions 90, and first ribs 92.

The description is returned to FIG. 1. Second holding unit 24 holds 32 cells 10 so that they are arranged in the staggered arrangement and so as to partially cover the negative side of the outer peripheral surfaces of cells 10 in the H direction. Second holding unit 24 has a substantially rectangular box shape as a whole, and one end in the H direction is open. Second holding unit 24 includes a second plane portion (not shown) and second side-surface portion 40. The second plane portion includes through holes (not shown) at the positions corresponding to the negative terminals of 32 cells 10 so as to electrically connect the negative terminals to negative-side lead portion 64 (described later). On opposite surfaces of second side-surface portion 40 in the W direction, engagement projections 44 coupled to engagement recesses 34 of first holding unit 22 are formed. Second slit 46 into which negative-side output terminal 82 is fitted is formed on one surface of second side-surface portion 40 in the L direction (surface on the left side in the page in FIG. 1). Second holding unit 24 is similar to first holding unit 22, so that detailed descriptions are omitted. Second holding unit 24 includes second storage portions 94 for partially storing the negative side of cells 10. A second rib projecting inward is formed on the inner surface of each second side-wall portion 96 for defining each second storage portion 94. Such second holding unit 24 is made of a material having predetermined insulation property, heat resistance, and strength, and is formed by integrally molding the second plane portion, second side-surface portion 40, second side-wall portions 96, and the second ribs.

Third holding unit 26 holds 32 cells 10 so that they are arranged in the staggered arrangement and so as to cover a region that is covered with neither the first holding unit nor the second holding unit, of the outer peripheral surfaces of cells 10 in the H direction. Third holding unit 26 includes third storage portions 98 each having a substantially columnar shape as a whole. Third storage portions 98 are arranged in the staggered arrangement correspondingly to the abovementioned arrangement of cells 10. In other words, three columns of third storage portions 98 are arranged in the W direction, and the storage portion columns include 11 third storage portions 98, 10 third storage portions 98, and 11 third storage portions 98 along the L direction, respectively. Such third holding unit 26 is made of aluminum, for example, and is formed in a predetermined shape by extrusion molding or die casting.

Holding unit 20 is formed by sandwiching third holding unit 26 between first holding unit 22 and second holding unit 24, and coupling them to each other via an engaging mechanism. The engaging mechanism includes engagement recesses 34 of first holding unit 22 and engagement projections 44 of second holding unit 24. Here, it can be also said that opposite side surfaces of third holding unit 26 in the W direction are formed in a wave shape that has projecting regions and recessed regions along the outline of the side surfaces of cells 10. Engagement recesses 34 of first holding unit 22 and engagement projections 44 of second holding unit 24 are formed at the positions corresponding to the recessed regions on the opposite side surfaces of third holding unit 26 in the W direction, respectively. Therefore, when holding unit 20 is formed, engagement recesses 34 can be engaged with engagement projections 44 inside the projecting regions on the opposite side surfaces of third holding unit 26 in the W direction. Therefore, a battery module can be formed by compactly stacking battery blocks 100 in the W direction, and the battery module can be downsized.

Holding unit 20 is formed by bringing one end of third holding unit 26 in the H direction into contact with the top surface of first side-surface portion 30 of first holding unit 22 and bringing the other end into contact with the top surface of second side-surface portion 40 of second holding unit 24. In the exemplary embodiment of the present invention, as the height in the H direction of first side-surface portion 30 of first holding unit 22, about ⅓ of the height of cells 10 in the longitudinal direction is assumed. Similarly, as the height in the H direction of second side-surface portion 40 of second holding unit 24, about ⅓ of the height of cells 10 in the longitudinal direction is assumed. In other words, third holding unit 26 holds cells 10 so as to cover a region of ⅓ (near the center) of the outer peripheries of cells 10 in the longitudinal direction. Third holding unit 26 simply covers a partial region near the center of the outer peripheries of cells 10 in the longitudinal direction, so that the weight of battery block 100 can be reduced. When variation in temperature occurs between adjacent cells 10, the temperature can be made uniform via third holding unit 26. The positive terminals of cells 10 are insulated from third holding unit 26 via first holding unit 22, and the negative terminals of cells 10 are insulated from third holding unit 26 via second holding unit 24. Therefore, even when third holding unit 26 is made of a material having a high heat conductivity, the risk of causing the short circuit between third holding unit 26 and the positive terminals or the negative terminals of cells 10 is suppressed, and the heat radiation property of battery block 100 can be improved while the safety is secured.

The width of third holding unit 26 in the W direction is set to be slightly wider (by 0.5 mm, for example) than the width of first holding unit 22 and second holding unit 24 in the W direction. The outlines of the opposite side surfaces of third holding unit 26 are located slightly outside the outline of first side-surface portion 30 of first holding unit 22 and the outline of second side-surface portion 40 of second holding unit 24. In other words, in the W direction, it can be also said that the opposite side surfaces of third holding unit 26 project to the outside of first side-surface portion 30 of first holding unit 22 and the outside of second side-surface portion 40 of second holding unit 24. Therefore, third holding unit 26 is apt to be exposed to the cooling air blown by a blast fan. Third holding unit 26 is apt to come into contact with a cooling pipe in which cooling water is circulated. Furthermore, third holding unit 26 is apt to come into contact with a fixing member of battery block 100 that has a heat radiation function such as a mounting bracket. Third holding unit 26 can be thermally coupled to these cooling media without being disturbed by first side-surface portion 30 of first holding unit 22 and second side-surface portion 40 of second holding unit 24. As a result, the heat radiation property of battery block 100 can be further improved.

When 32 cells 10 are stored in holding unit 20, the positive electrodes are aligned to one side and the negative electrodes are aligned to the other side. In FIG. 1, the one side means the right side along the H direction in the page, and the other side means the left side along the H direction in the page.

Positive-side lead portion 48 is a connection member for electrically interconnecting the positive electrodes of arranged and aligned cells 10. Positive-side lead portion 48 includes positive-side lead terminals 50 and positive-side lead connection portion 52. One end of each positive-side lead terminal 50 is connected to the positive terminal of each cell 10 via through hole 32 of first holding unit 22, and the other end is connected to positive-side lead connection portion 52. By appropriately adjusting the shape and length of each positive-side lead terminal 50, positive-side lead terminal 50 can be made to obtain a protecting function similar to that of a fuse that melts due to overcurrent. One end of each positive-side lead terminal 50 is metallurgically bonded to the positive terminal of each cell 10 by resistance welding, ultrasonic welding, or laser welding, for example. Thirty-two cells 10 are classified into a predetermined number of cell groups, and the positive electrodes of cells 10 included in each cell group are interconnected in parallel via positive-side lead terminals 50 and positive-side lead connection portion 52. Such positive-side lead portion 48 is made of a material having an electric conductivity, and is formed by integrally molding positive-side lead terminals 50 and positive-side lead connection portion 52.

Positive-side collection plate 54 is a connection member for electrically interconnecting the positive electrodes of cells 10 interconnected in parallel in each cell group. Positive-side collection plate 54 includes positive-side collection portion 56 and positive-side output portion 58 folded substantially perpendicularly to positive-side collection portion 56. Positive-side collection portion 56 is connected to positive-side lead portion 48 and interconnects the cell groups in parallel. In other words, positive-side collection portion 56 interconnects the positive electrodes of 32 cells 10 in parallel via positive-side lead portion 48. Positive-side collection portion 56 is formed so as to extend the clearance between the first cell column and the second cell column in the L direction and extend the clearance between the second cell column and the third cell column in the L direction. In such configuration, the material can be saved and the weight of battery block 100 can be reduced compared with the case that positive-side collection portion 56 has a substantially rectangular plate shape that covers entire first plane portion 28 of first holding unit 22.

Positive-side output portion 58 includes through hole 60 into which positive-side output terminal 80 is inserted. When positive-side output terminal 80 is inserted into through hole 60, the positive electrodes of 32 cells 10 are electrically connected to positive-side output terminal 80 and current can be input or output via positive-side output terminal 80. Such positive-side collection plate 54 is made of a material having an electric conductivity and is formed in a predetermined shape.

Positive-side lid 62 is a plate material that is arranged outside positive-side collection plate 54 and electrically insulates the positive side of cells 10 from the outside. Positive-side lid 62 is coupled to first holding unit 22 by the engaging mechanism, adhesion, or a combination of them. Such positive-side lid 62 is made of a material having a predetermined insulation property, heat resistance, and strength, and is formed in a predetermined shape.

Negative-side lead portion 64 is a connection member for electrically interconnecting the negative electrodes of arranged and aligned cells 10. Negative-side lead portion 64 includes negative-side lead terminals 66 and negative-side lead connection portion 68. One end of each negative-side lead terminal 66 is connected to the negative terminal of each cell 10 via a through hole of second holding unit 24, and the other end is connected to negative-side lead connection portion 68. By appropriately adjusting the shape and length of each negative-side lead terminal 66, negative-side lead terminal 66 can be made to obtain a protecting function similar to that of a fuse that melts due to overcurrent. One end of each negative-side lead terminal 66 is metallurgically bonded to the negative terminal of each cell 10 by resistance welding, ultrasonic welding, or laser welding, for example. The negative electrodes of cells 10 included in each cell group are interconnected in parallel via negative-side lead terminals 66 and negative-side lead connection portion 68. Such negative-side lead portion 64 is made of a material having an electric conductivity, and is formed by integrally molding negative-side lead terminals 66 and negative-side lead connection portion 68.

Negative-side collection plate 70 is a connection member for electrically interconnecting the negative electrodes of cells 10 interconnected in parallel in each cell group. Negative-side collection plate 70 includes negative-side collection portion 72 and negative-side output portion 74 folded substantially perpendicularly to negative-side collection portion 72. Negative-side collection portion 72 is connected to negative-side lead portion 64 and interconnects the cell groups in parallel. In other words, negative-side collection portion 72 interconnects the negative electrodes of 32 cells 10 in parallel via negative-side lead portion 64. Negative-side collection portion 72 is formed so as to extend the clearance between the first cell column and the second cell column in the L direction and extend the clearance between the second cell column and the third cell column in the L direction. In such configuration, the material can be saved and the weight of battery block 100 can be reduced compared with the case that negative-side collection portion 72 has a substantially rectangular plate shape that covers the entire second plane portion of second holding unit 24.

Negative-side output portion 74 includes through hole 76 into which negative-side output terminal 82 is inserted. When negative-side output terminal 82 is inserted into through hole 76, the negative electrodes of 32 cells 10 are electrically connected to negative-side output terminal 82 and current can be input or output via negative-side output terminal 82. Such negative-side collection plate 70 is made of a material having an electric conductivity, and is formed in a predetermined shape.

Figure 4:
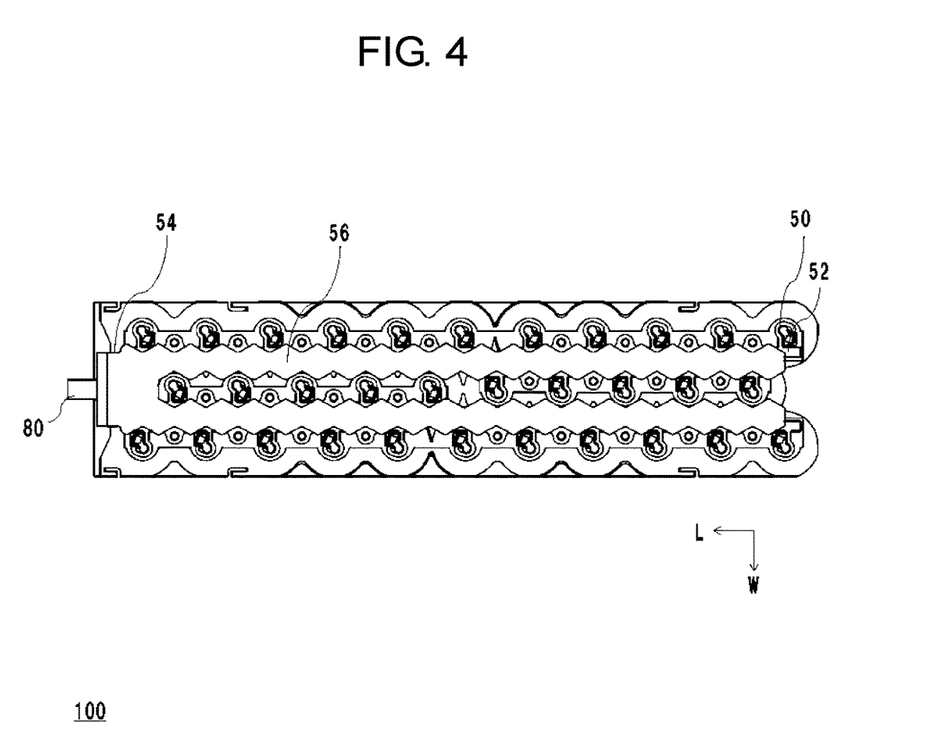
FIG. 4 is a plan view of the battery block in accordance with the exemplary embodiment of the present invention.

FIG. 4 is a plan view of battery block 100 used in the exemplary embodiment of the present invention. For simplifying the description, positive-side lid 62 of battery block 100 is omitted in FIG. 4. As shown in FIG. 4, positive-side lead portion 48 is fixed by inserting a fixing member such as a screw into a screw hole formed in first holding unit 22. Next, in a state where positive-side output terminal 80 is disposed in first slit 36 of first holding unit 22, positive-side collection plate 54 is fitted into first holding unit 22 so as to make positive-side output terminal 80 penetrate through hole 60. Positive-side collection plate 54 is in contact with positive-side lead portion 48, and is fixed to first holding unit 22 via fastening member 84. The configuration of the negative side of battery block 100 is similar to that of the positive side, so that detailed descriptions are omitted. However, negative-side lead portion 64 is fixed to second holding unit 24. Negative-side collection plate 70 is in contact with negative-side lead portion 64 so as to make negative-side output terminal 82 penetrate through hole 76, and is fixed to second holding unit 24 via fastening member 86.

In the exemplary embodiment of the present invention, cells 10 are arranged in a predetermined arrangement while the positive electrodes of the cells are aligned to one side and the negative electrodes are aligned to the other side, and are held by holding unit 20. Holding unit 20 includes first holding unit 22, second holding unit 24, and third holding unit 26. First holding unit 22 holds cells 10 so as to partially cover the one side of the outer peripheral surfaces of cells 10 in the longitudinal direction. Second holding unit 24 holds cells 10 so as to partially cover the other side of the outer peripheral surfaces of cells 10 in the longitudinal direction. Third holding unit 26 holds cells 10 so as to cover a region that is covered with neither first holding unit 22 nor second holding unit 24, of the outer peripheral surfaces of cells 10 in the longitudinal direction. Therefore, the weight of battery block 100 can be reduced. Third holding unit 26 can be certainly insulated from the positive terminals and negative terminals of cells 10, a material having a high heat conductivity can be applied to third holding unit 26, and the heat radiation property of battery block 100 can be improved while the safety is secured. The opposite side surfaces of third holding unit 26 in the W direction are each formed in a wave shape that has projecting regions and recessed regions along the outline of the side surfaces of cells 10. Engagement recesses 34 of first holding unit 22 and engagement projections 44 of second holding unit 24 are formed at the positions corresponding to the recessed regions on the opposite side surfaces of third holding unit 26, respectively. Therefore, engagement recesses 34 can be engaged with engagement projections 44 on the inside of the projecting regions on the opposite side surfaces of third holding unit 26. Therefore, battery blocks 100 can be compactly stacked. In first holding unit 22, first rib 92 is formed on the inner surface of each first side-wall portion 90 so as to project inward. Here, each first side-wall portion 90 defines each first storage portion 88 for partially storing the positive side of each cell 10. A second rib is formed on the inner surface of each second side-wall portion 96 so as to project inward. Here, each second side-wall portion 96 defines each second storage portion 94 for partially storing the negative side of each cell 10. Therefore, rattling of cell 10 can be prevented without using an adhesive or the like, the manufacturing cost of battery block 100 can be reduced, and the weight is reduced. Cells 10 are arranged in the staggered arrangement. Therefore, battery block 100 can be compacted. Positive-side collection portion 56 and negative-side collection portion 72 are formed so as to extend the clearance between the first cell column and second cell column in the L direction and extend the clearance between the second cell column and third cell column in the L direction. Therefore, the material can be saved and the weight of battery block 100 can be reduced.

The present invention has been described on the basis of the exemplary embodiment. Persons skilled in the art understand that this exemplary embodiment is an example, various modified examples can be created by combining various components and various processes, and these modified examples are in the scope of the present invention.

MODIFIED EXAMPLE

The above-mentioned exemplary embodiment has described the example where the height of a third holding unit in the H direction is set at $\frac{1}{3}$ of the height of cells 10 in the longitudinal direction. In this point, the height of the third holding unit in the H direction may be different from $\frac{1}{3}$ of the height of cells 10 in the longitudinal direction.

For example, when the heat radiation property is emphasized, the height in the H direction of first side-surface portion 30 of first holding unit 22 and the height of second side-surface portion 40 of second holding unit 24 may be adjusted so that the height of the third holding unit in the H direction is higher than $\frac{1}{3}$ of the height of cells 10 in the longitudinal direction. While, when the weight reduction or economic efficiency is emphasized, the height in the H direction of first side-surface portion 30 of first holding unit 22 and the height of second side-surface portion 40 of second holding unit 24 may be adjusted so that the height of the third holding unit in the H direction is lower than ⅓ of the height of cells 10 in the longitudinal direction.

The invention related to the present exemplary embodiment may be specified using the following items.

[Item 1]

A battery block includes a plurality of cells, and a holding unit for holding the plurality of cells so that they are arranged in a predetermined arrangement while the positive electrodes of the cells are aligned to one side and the negative electrodes are aligned to the other side. The holding unit includes: a first holding unit that is made of a material having an insulation property, and holds the cells so as to partially cover the one side of the outer peripheral surfaces of the cells in the longitudinal direction; a second holding unit that is made of a material having an insulation property, and holds the cells so as to partially cover the other side of the outer peripheral surfaces of the cells in the longitudinal direction; and a third holding unit that is made of a material having a heat conductivity, and holds the cells so as to cover a region that is covered with neither the first holding unit nor the second holding unit, of the outer peripheral surfaces of the cells in the longitudinal direction.

[Item 2]

In the battery block according to item 1, a side surface portion of the third holding unit is formed in a wave shape that has projecting regions and recessed regions along the outline of the side surfaces of the cells. The first holding unit is engaged with the second holding unit so as to grasp the third holding unit at the recessed regions.

[Item 3]

In the battery block according to item 2, each of the first holding unit and second holding unit includes storage portions that are defined by a plane portion and side-wall portions and store the plurality of cells. Each side-wall portion includes a rib projecting inward.

[Item 4]

In the battery block according to item 3, the predetermined arrangement employed when the plurality of cells are arranged is a staggered arrangement that minimizes the clearance between adjacent cells.

[Item 5]

In the battery block according to item 4, the plane portion includes a plurality of through holes at the positions corresponding to the positive terminals or negative terminals of the plurality of cells. The plane portion includes a first surface brought into contact with the positive side or negative side of the cells, and a second surface facing the first surface. A collection plate is disposed in a region on the second surface that does not have the plurality of through holes. The collection plate extends in the extending direction of columns of the cells arranged in the staggered arrangement, and electrically interconnects the cells.

INDUSTRIAL APPLICABILITY

A battery block of the present invention is useful as a power source for driving a motor of an electric car or the like, or as a backup power source or the like.

REFERENCE MARKS IN THE DRAWINGS 10 cell
20 holding unit
22 first holding unit
24 second holding unit
26 third holding unit
28 first plane portion
30 first side-surface portion
32, 60, 76 through hole
34 engagement recess
36 first slit
40 second side-surface portion
44 engagement projection
46 second slit
48 positive-side lead portion
50 positive-side lead terminal
52 positive-side lead connection portion
54 positive-side collection plate
56 positive-side collection portion
58 positive-side output portion
62 positive-side lid
64 negative-side lead portion
66 negative-side lead terminal
68 negative-side lead connection portion
70 negative-side collection plate
72 negative-side collection portion
74 negative -side output portion
78 negative-side lid
80 positive-side output terminal
82 negative-side output terminal
84, 86 fastening member
88 first storage portion
90 first side-wall portion
92 first rib
94 second storage portion
96 second side-wall portion
98 third storage portion

The invention claimed is:

1. A battery block comprising:
a plurality of cells; and
a holding unit for holding the plurality of cells so that the plurality of cells are arranged in a predetermined arrangement while positive electrodes of the plurality of cells are aligned to a first side and negative electrodes of the plurality of cells are aligned to a second side,
wherein the holding unit includes:
a first holding unit made of a material having an insulation property, and holding the plurality of cells so as to partially cover the first side of outer peripheral surfaces of the plurality of cells in a longitudinal direction;
a second holding unit made of a material having an insulation property, and holding the plurality of cells so as to partially cover the second side of the outer peripheral surfaces of the plurality of cells in the longitudinal direction; and
a third holding unit made of a material having a heat conductivity, and holding the plurality of cells so as to cover a first region on the outer peripheral surfaces of the plurality of cells in the longitudinal direction, the first region being covered with neither the first holding unit nor the second holding unit,
the first holding unit, the second holding unit, and the third holding unit are divided, and arranged in the longitudinal direction,
the first holding unit has a first engagement portion, and the second holding unit has a second engagement portion which is directly engaged with the first engagement portion, the first holding unit is coupled to the second holding unit so as to grasp the third holding unit by the first engagement portion being engaged with the second engagement portion, the third holding unit is dimensioned such that a pair of second regions, other than said first region, on the outer peripheral surfaces of the plurality of cells and extending in opposite directions from each other in the longitudinal direction, is uncovered by the third holding unit, the third holding unit has storage portions which each have openings at both ends of the longitudinal direction of each of the storage portions, and the third holding unit is sandwiched between the first holding unit and second holding unit in the longitudinal direction.

2. The battery block according to claim 1, wherein
a side surface portion of the third holding unit is formed in a wave shape having projecting regions and recessed regions along an outline of side surfaces of the plurality of cells, and the first engagement portion of the first holding unit is engaged with the second engagement portion of the second holding unit at the recessed regions.

3. The battery block according to claim 2, wherein
each of the first holding unit and the second holding unit includes storage portions, the storage portions being defined by a plane portion and side-wall portions and storing the plurality of cells, and each of the side-wall portions includes a rib projecting inward.

4. The battery block according to claim 3, wherein
the predetermined arrangement employed when the plurality of cells are arranged is a staggered arrangement minimizing a clearance between adjacent cells.

5. The battery block according to claim 4, wherein
the plane portion includes a plurality of through holes at positions corresponding to positive terminals or negative terminals of the plurality of cells, the plane portion includes a first surface brought into contact with a positive side or a negative side of the plurality of cells, and a second surface facing the first surface, and a collection plate is disposed in a region having none of the plurality of through holes on the second surface, wherein the collection plate extends in an extending direction of a column of the plurality of cells arranged in the staggered arrangement, and electrically interconnects the plurality of cells.

6. A battery block comprising:
a plurality of cells; and
a holding unit for holding the plurality of cells so that the plurality of cells are arranged in a predetermined arrangement,
wherein the holding unit includes:
 a first holding unit made of a material having an insulation property, and holding the plurality of cells so as to partially cover a first side of outer peripheral surfaces of the plurality of cells in a longitudinal direction;
 a second holding unit made of a material having an insulation property, and holding the plurality of cells so as to partially cover a second side of the outer peripheral surfaces of the plurality of cells in the longitudinal direction; and
 a third holding unit made of a material having a heat conductivity, and holding the plurality of cells so as to cover a first region on the outer peripheral surfaces of the plurality of cells in the longitudinal direction, the first region being covered with neither the first holding unit nor the second holding unit, the first holding unit, the second holding unit, and the third holding unit are divided, and arranged in the longitudinal direction, the first holding unit has a first engagement portion, and the second holding unit has a second engagement portion which is directly engaged with the first engagement portion, the first holding unit is coupled to the second holding unit so as to grasp the third holding unit by the first engagement portion being engaged with the second engagement portion, the third holding unit is dimensioned such that a pair of second regions, other than said first region, on the outer peripheral surfaces of the plurality of cells and extending in opposite directions from each other in the longitudinal direction, is uncovered by the third holding unit, the third holding unit has storage portions which each have openings at both ends of the longitudinal direction of each of the storage portions, and the third holding unit is sandwiched between the first holding unit and second holding unit in the longitudinal direction.

7. The battery block according to claim 6, wherein
a side surface portion of the third holding unit is formed in a wave shape having projecting regions and recessed regions along an outline of side surfaces of the plurality of cells, and the first engagement portion of the first holding unit is engaged with the second engagement portion of the second holding unit at the recessed regions.

8. The battery block according to claim 7, wherein
each of the first holding unit and the second holding unit includes storage portions, the storage portions being defined by a plane portion and side-wall portions and storing the plurality of cells, and each of the side-wall portions includes a rib projecting inward.

9. The battery block according to claim 8, wherein
the predetermined arrangement employed when the plurality of cells are arranged is a staggered arrangement minimizing a clearance between adjacent cells.

* * * * *